Patented Mar. 30, 1926.

1,578,568

UNITED STATES PATENT OFFICE.

JOHN M. WIDMER, OF CEDAR RAPIDS, IOWA, ASSIGNOR TO PENICK & FORD, LTD., INCORPORATED, OF CEDAR RAPIDS, IOWA, A CORPORATION OF DELAWARE.

MANUFACTURE OF CONVERSION PRODUCTS OF STARCH.

No Drawing. Application filed May 23, 1923. Serial No. 641,004.

*To all whom it may concern:*

Be it known that I, JOHN M. WIDMER, a citizen of Switzerland, residing at Cedar Rapids, in the county of Linn and State of Iowa, have invented certain new and useful Improvements in the Manufacture of Conversion Products of Starch, of which the following is a specification.

This invention relates to the conversion of starch, more especially corn starch, although the invention is applicable to other starches, by the process of acid hydrolysis or by diastatic action, and its principal object is to provide certain novel and improved methods of treating the material in the manufacture of glucose, maltose or allied substances, whereby a product can be made at relatively low cost and with certainty of success, which will be free, or substantially free, from the albumenoid substances or other impurities which produce discoloration and otherwise detrimentally affect the quality of the product.

I shall describe the improved method in detail and in connection with the manufacture by the process of acid hydrolysis of what is commonly called glucose (starch conversion product containing approximately 40% to 45% reducing sugars calculated as dextrose), but I wish to make it clear that the invention is not to be considered as limited to the particular steps to be described for the purpose of illustration, nor to the manufacture only of glucose. The invention is applicable to the manufacture of solid grape sugar, corn sugar for example, and certain of the improvements herein disclosed and claimed could be advantageously used in the production of maltose by the diastatic method of conversion.

In the case of glucose manufactured by the process of acid hydrolysis, the preferred method of procedure is as follows: The starch is first, preferably, treated so as to remove therefrom as much of the residual protein content as can be removed by mechanical means. For example, assuming that the starch has been tabled, according to the usual method, to remove the "gluten", it should be thoroughly washed when taken from the starch tables to eliminate as far as possible the soluble proteins which may be contained therein. It is possible, according to present day practice, to treat the starch so that it will contain only from .3% to .35% of protein matter, soluble and insoluble, these percentages being calculated on the basis of dry substances. The starch thus purified is mixed with water and acid to form a liquor of the usual density and acidity for conversion and is then converted to the glucose stage in the usual manner, either in closed converters under steam pressure, or in open converters.

After conversion the liquor is neutralized in the customary manner. That is, when hydrochloric acid is used as the hydrolyzing agent the neutralization is with sodium carbonate. If sulphuric acid is employed the neutralizing agent is calcium carbonate. The principal purpose of the neutralizing step is to remove from the product the acid used during conversion but the neutralization also "salts out" such proteins as are insoluble in practically neutral solutions. The next step of the process is, preferably, the filtering of the converted liquor to remove these insolubles, together with any other insoluble impurities that the liquor may contain, such as oil, fiber, and the like.

The liquor still contains soluble proteins, that is, proteins for the most part originally insoluble which have been rendered soluble by contact with the hydrolyzing acid. So far as I am aware, the soluble albumenoid substances have never been successfully eliminated from the converted liquor. Their presence in the glucose is detrimental in several respects. For example, the glucose is likely to foam when boiled in a candy kettle. They sometimes produce a discoloration and cloudiness which reappears after the usual treatment with carbon. I have found that in a large measure these albumenoid substances may be removed from the converted liquor, provided the splitting of the protein in reaction with the acid has not proceeded too far, that is, to the amino acid stage, by a method of coagulation and precipitation. The coagulating agent used is tannic acid, the term "tannic acid" being used here in its broad signification as covering any tannins or extract of tannin. As an example, I prefer to use what is called in the trade a technical grade of tannic acid. The tannic acid is put into the converted liquor while the same is still hot, or, if need be, the liquor may be heated. The amount will depend upon the quantity of soluble albumenoids in the liquor and this will depend upon several factors: The amount of the residual protein in the starch liquor introduced into the converters, the temperature or pressure at which the conversion takes place, and the extent to which the conversion is carried as involving the factor of time. For glucose, using the term in the sense above defined, produced from starch containing .3% to .35% of protein and converted at a temperature corresponding to 40 pounds steam pressure, I ordinarily employ four pounds of the so-called technical grade of tannic acid for each 100,000 pounds of starch converted, computed on the basis of dry substances. The liquor may then be filtered to remove the precipitates. The liquor is preferably treated with carbon, bone char or vegetable carbon, for example, for the purpose of absorbing the excess of tannic acid and removing any trace of color that the liquor may have as well as to filter out the insoluble protein substances that have been formed by the treatment with tannic acid. This step of the process may be carried out either by passing the liquor through the bone char filters customarily used in the industry or by mixing therein vegetable carbon such as the substance that goes by the trade name of "norit" or other similar substances. The glucose is then ready for concentration in the evaporators.

It is possible to employ the method of coagulating the soluble albumenoids in the tannic acid in the manufacture of solid grape sugar as well as in the manufacture of glucose. The advantage is less pronounced where the conversion is carried as far as is necessary for the manufacture of grape sugar because in such case the action of the acid on the proteins is likely to convert them to a larger extent into amino acids which are unaffected by the tannic acid. By reducing the residual proteins in the starch to a minimum a conversion to the glucose stage or thereabouts can be effected without reducing any considerable amount of the proteins to the amino acid stage. That is to say, substantially all of the albumenoid substances can be coagulated by the tannin and thus brought into a condition permitting their removal. The tannic acid method of coagulation and precipitation of albumenoid substances may also be employed for the purification of maltose liquors converted diastatically.

For the purpose of insuring the reaction of the tannic acid upon the protein as described in a more positive and effective way, and for other reasons to be described, I prefer to add phosphoric acid or its salts to the starch before conversion, phosphates being used preferably, for reasons of economy. When this method is followed the phosphates are decomposed in the converter by the stronger hydrolyzing acid forming free phosphoric acid. When the converted liquor is treated to neutralize the hydrolyzing acid the phosphoric acid is also neutralized in part but not completely. Conversion products of starch, as ordinarily manufactured, contain soluble iron salts resulting from the contact of the acids used in the manufacture and refinement of the starch and in its conversion with the iron pipes and containers through which the material passes. These traces of iron in the glucose are objectionable under certain conditions, for example, in making some kinds of candy because of the undesirable colors which they give the product. The phosphates react with these iron salts forming insoluble iron phosphates which are precipitated and can be readily removed with the other impurities. The phosphoric acid and acid phosphates in the converted liquor serve to protect the organic substances (dextrose, dextrines, maltose) from being acted upon by the alkaline substances used in the neutralizing step, making it possible to neutralize all or substantially all of the hydrolyzing acid without detriment to the organic substances. The complete, or substantially complete neutralization of the hydrolyzing acid is desirable for several reasons. More of the insoluble and colloidal proteins will be salted out by the neutralizing operation when the hydrolyzing acid is completely neutralized. With the relatively strong hydrolyzing acid eliminated or reduced to a minimum the converted liquor will pick up less iron during the subsequent stages. Moreover, the presence of phosphoric acid in place of the stronger hydrolyzing acid in the converted liquor has a direct bearing upon the action of the tannic acid on the coagulable albumenoids. Tannic acid will not react in the presence of any considerable quantities of hydrochloric acid or sulphuric acid, the acids commonly used for the conversion of starch. The tannic acid, on the other hand, is not affected by the presence of phosphoric acid or acid phosphates. Therefore, by providing a treatment which will give the converted liquor a phosphoric acid content the hydrolyzing acid may be completely neutralized or substantially so, without danger of reaction between the neutralizing agent and the organic substances, and the converted liquor put into such condition that the tannic acid will act most effectively upon the albumenoid impurities to coagulate and precipitate them.

The phosphate is preferably put into the converters with the starch liquor and hydrolyzing acid but it may be introduced into the liquor after conversion. The former expedient is preferable because the phosphate can, in that case, be measured accurately on the starch and also because the phosphoric acid produced in the converter has a certain catalytic action on the starch which aids the conversion.

The use of phosphates in this connection is of special value where vegetable carbon is used for purification purposes since the vegetable carbon does not contain any phosphates as does bone black or animal charcoal. The process is preferably carried out so that the liquor contains throughout an excess of phosphates. As a result the tendency of the liquor to pick up iron from the apparatus through which it passes is counteracted.

I claim:

1. The improved method of manufacturing conversion products of starch, which comprises: conversion of the starch by acid hydrolysis; neutralization of the hydrolyzing acid in the presence of phosphoric acid; and treatment of the liquid with tannic acid to coagulate and precipitate albumenoid impurities.

2. The improved method of manufacturing conversion products of starch which comprises: conversion of the starch by acid hydrolysis; and the neutralization of substantially all of the hydrolyzing acid in the presence of such an amount of a weaker acid that the excess over that which is neutralized protects the converted substance from alkaline reactions.

3. The improved method of manufacturing conversion products of starch which comprises: conversion of the starch by acid hydrolysis; neutralization of substantially all of the hydrolyzing acid in the presence of a weaker acid which protects the converted substance from alkaline reactions; and the treatment of the converted liquor with an acid which coagulates and precipitates the soluble albumenoids.

4. The improved method of manufacturing conversion products of starch which comprises: subjecting the starch, water, a hydrolyzing acid and a phosphate to heat to convert the starch with the phosphate in such quantities that on subsequent neutralization, there will be an excess of phosphoric acid; completely neutralizing the hydrolizing acid; and filtering out the precipitate.

5. The improved method of manufacturing conversion products of starch which comprises: subjecting the starch, water, a hydrolyzing acid and a phosphate to heat to convert the starch; neutralizing the hydrolyzing acid; filtering out the precipitate; treating the liquor with tannic acid; and filtering out the precipitated matter.

6. The improved method of making glucose from starch which comprises: conversion of the starch in the presence of a hydrolyzing acid to the glucose stage; neutralization of the hydrolyzing acid in the presence of phosphoric acid; filtration of precipitated impurities; treatment of the liquor with tannic acid; filtration to remove the coagulated albumenoids and insoluble mineral salts; and treatment of the liquor with carbon to remove excess of tannic acid and any trace of color.

JOHN M. WIDMER.